United States Patent
Meirman et al.

(10) Patent No.: US 9,104,812 B2
(45) Date of Patent: Aug. 11, 2015

(54) INJECTION OF DATA INTO A SOFTWARE APPLICATION

(75) Inventors: Ilan Meirman, Petah Tikwa (IL); Dekel Tal, Rehovot (IL); Dayan Siton, Or Yehuda (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 217 days.

(21) Appl. No.: 13/637,848

(22) PCT Filed: Apr. 10, 2010

(86) PCT No.: PCT/US2010/030657
§ 371 (c)(1),
(2), (4) Date: Sep. 27, 2012

(87) PCT Pub. No.: WO2011/126494
PCT Pub. Date: Oct. 13, 2011

(65) Prior Publication Data
US 2013/0074001 A1    Mar. 21, 2013

(51) Int. Cl.
G06F 3/048    (2013.01)
G06F 11/36    (2006.01)
G06F 9/44    (2006.01)

(52) U.S. Cl.
CPC ........ G06F 11/3688 (2013.01); G06F 11/3664 (2013.01); G06F 11/3684 (2013.01); G06F 8/33 (2013.01)

(58) Field of Classification Search
USPC .................................. 715/781; 707/803, 805
See application file for complete search history.

(56) References Cited

U.S. PATENT DOCUMENTS

| | | | |
|---|---|---|---|
| 6,252,972 B1* | 6/2001 | Linnartz | 382/100 |
| 6,490,601 B1* | 12/2002 | Markus et al. | 715/207 |
| 2002/0111961 A1* | 8/2002 | Billings et al. | 707/505 |
| 2003/0052917 A1 | 3/2003 | Dubovsky | |
| 2003/0084429 A1 | 5/2003 | Schaefer | |
| 2003/0126517 A1 | 7/2003 | Givoni et al. | |
| 2005/0086643 A1 | 4/2005 | Shane | |
| 2005/0204343 A1 | 9/2005 | Kisamore et al. | |
| 2006/0069696 A1 | 3/2006 | Becker et al. | |
| 2006/0212540 A1 | 9/2006 | Chon et al. | |
| 2007/0074130 A1 | 3/2007 | Folting et al. | |
| 2007/0165034 A1 | 7/2007 | Mielke | |
| 2007/0203908 A1 | 8/2007 | Wang et al. | |
| 2007/0203940 A1 | 8/2007 | Wang et al. | |
| 2008/0065671 A1* | 3/2008 | Dejean et al. | 707/102 |

(Continued)

FOREIGN PATENT DOCUMENTS

| | | |
|---|---|---|
| CN | 1755679 | 4/2006 |
| CN | 101278279 | 10/2008 |

OTHER PUBLICATIONS

The Hague, Extended European Search Report, Jun. 20. 2014, 7 pages, Munich, Germany.

(Continued)

Primary Examiner — Matthew Ell
(74) Attorney, Agent, or Firm — Hewlett-Packard Patent Department

(57) ABSTRACT

One embodiment is a method for injecting data into a software application. The method displays a plurality of different controls of a software application and receives a single selection of data stored in a data source. In response to this selection, the method injects the data from the data source into the plurality of different controls of the software application.

20 Claims, 12 Drawing Sheets

(56) References Cited

U.S. PATENT DOCUMENTS

| | | |
|---|---|---|
| 2008/0256394 A1 | 10/2008 | Rashevsky et al. |
| 2009/0019429 A1 | 1/2009 | Randow et al. |
| 2009/0210418 A1 | 8/2009 | Arasu et al. |
| 2009/0228871 A1 | 9/2009 | Edwards et al. |

OTHER PUBLICATIONS

The Hague, The Extended European Search Report, Aug. 6, 2013, 10 pages, Munich, Germany.

* cited by examiner

INJECTION OF DATA INTO A SOFTWARE APPLICATION

FIELD OF THE INVENTION

The present invention relates to injection of data into a software application.

BACKGROUND

Software testers often enter sample data into a software application during the development and testing of the application. While performing a manual functional test on a software application or a web page, the tester often needs to repeatedly complete long forms with various data. Since the data is manually entered, filling these forms is tedious, time consuming, and error prone. This can result in unreliable test results and fewer data scenarios being tested. These issues inevitably affect the efficacy of the testing and ultimately the quality of the resulting software application.

DETAILED DESCRIPTION

Example embodiments relate to automatic injection of data into a software application or web page form.

While testing a software application, example embodiments enable a tester fill out or complete forms with miscellaneous data that is used to test the application. The data is automatically injected or inserted into application forms, such as standalone software applications or web applications. Example embodiments automatically map data from a data source into a correct location in the application which is being tested or developed. One embodiment is included or integrated with a software testing tool. The software testing tool and/or processes of data injection are included into a work flow of the design, development, and testing of new software applications.

As discussed more fully below, example embodiments provide automatic injection of data into a software application in a variety of environments, such as applications for the World Wide Web (the web), standalone applications, customer relationship management (CRM) applications, and enterprise resource planning (ERP) applications. Example embodiments include a probability-based algorithm to match a user interface control to its appropriate label and a probability-based algorithm to match the data entries to the user interface elements. Example embodiments also include methods that seamlessly integrate the data injection capabilities into a manual testing tool and a graphical animated way to visualize the injection and testing process.

Figure 1:
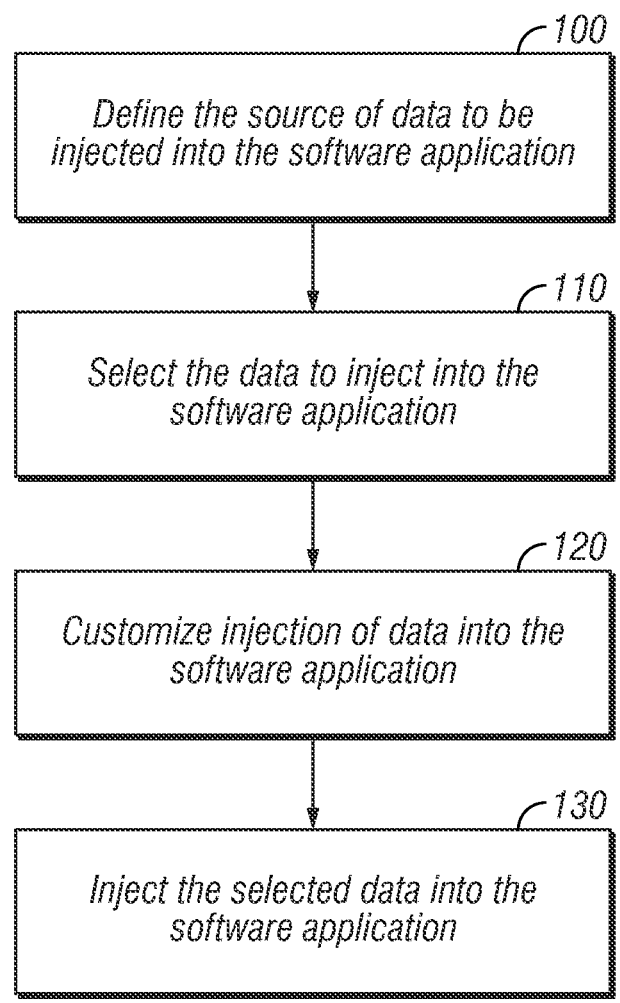
FIG. 1 shows a flow diagram for injecting data into an application in accordance with an example embodiment.

FIG. 1 shows a flow diagram for injecting data into a software application in accordance with an example embodiment.

According to block 100, the source of data to be injected or inserted into the software application is defined.

There are several data sources that the tester can use for data injection. By way of example, these data sources include, but are not limited to, worksheets (such as Excel worksheets), comma separated values (CSV) files, extensible markup language (XML) files, databases (such as structured query language (SQL) queries), and results of Web Service calls.

In one example embodiment, these data sources work with a tabular data model. Each set of related data has a unique label that identifies the data. For example, in an Excel worksheet or CSV file, each column has a title. In XML files, the tag name is used as the data identification. In a database, field names are used to identify the data.

Before conducting a manual test, the tester or user defines or identifies one or more data sources. For example, the user can browse for a particular file, such as Excel, CSV, and/or XML files. For SQL queries, the user can define the database connection settings and the SQL query.

Figures 2A, 2B:
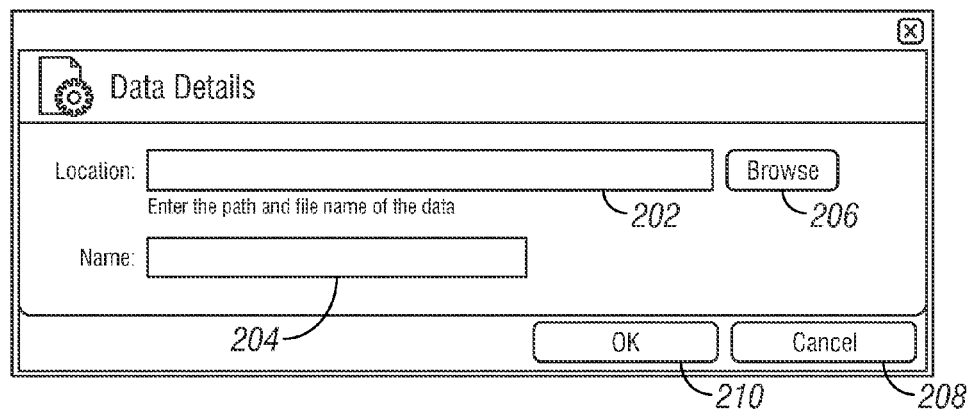
FIG. 2A shows a computer window having a dialogue box for a user to define a location of data sources that provide data to test the software application in accordance with an example embodiment.
FIG. 2B shows a computer window having a dialogue box for a user to select data to be injected into the software application in accordance with an example embodiment.

By way of example, FIG. 2A shows a computer window having a dialogue box 200 for a user to define a location of data sources that provide data to test the software application. The dialogue box 200 includes a location field 202 to enter a path and file name of the data, a name field 204 to enter the name of the data, and a browse button 206 to search for the data. A cancel button 208 and OK button 210 are also provided.

According to block 110, the data to be injected into the software application is selected.

During the testing of the software application, the tester opens a sidebar or dialogue box that displays the data source entries selected for entry into the software application. For example, FIG. 2B shows a computer window having a dialogue box 210 for a user to select data to be injected into the software application. By way of example, the box 210 includes data 212 arranged in table (or tabular format) having multiple rows and columns with headings, such as first name, last name, age, and ID.

The user can click on a row to select the data in the row for injection into the software application. For example, the second row 214 is highlighted to indicate that this row of data is being selected for input. Thus, a single selection of data (e.g., an entire row being selected with a single click) selects a plurality of different data for injection into the software application.

The box or sidebar 210 is displayed during data entry and is available upon request by the user (e.g., the user provides an input request to have the sidebar displayed on the screen).

According to block 120, the injection of data is customized. One embodiment provides the user with an option to customize the process of injecting data into the software application.

Figure 2C:
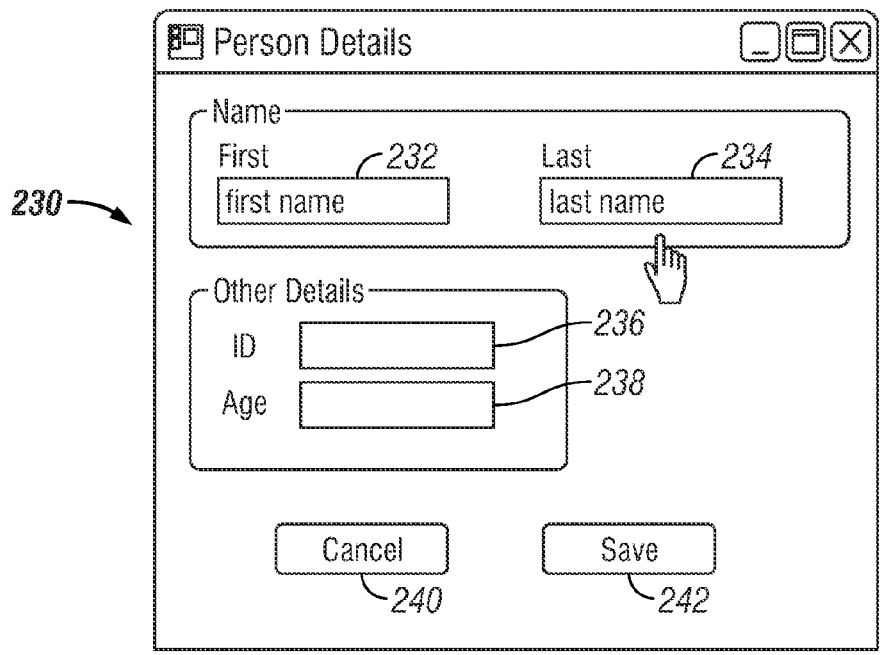
FIG. 2C shows a computer window having a first dialogue box for a user to customize the selection of data injected into the software application in accordance with an example embodiment.
Figure 2D:
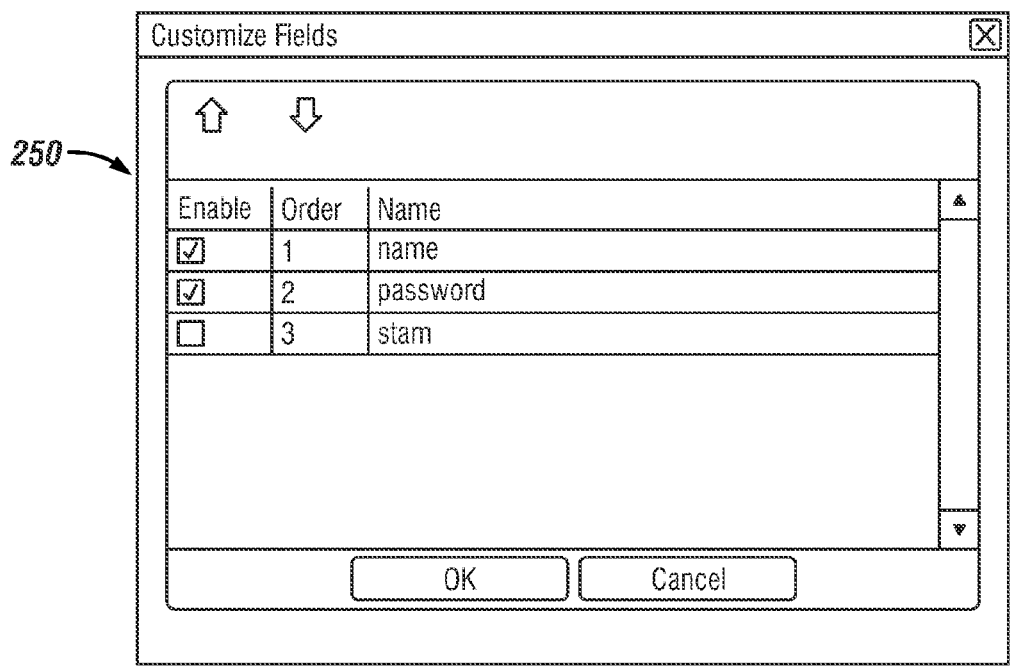
FIG. 2D shows a computer window having a second dialogue box for a user to customize the selection of data injected into the software application in accordance with an example embodiment.

The user can examine which controls are going to receive data prior to the injection itself. FIG. 2C shows a computer window having a first dialogue box 230 for a user to customize the selection of data injected into the software application. FIG. 2D shows a computer window having a second dialogue box 250 for a user to customize the selection of data injected into the software application.

The dialogue box 230 includes a first name field, 232, a last name field 234, an ID field 236, an age field 238, a cancel button 240, and a save button 242. For illustration, the first name field 232 and last name field 234 are highlighted to indicate that these fields are selected by the user.

The dialogue box 250 includes columns entitled Enable (to enable or disable the row), Order (to display the numerical order in which the data is injected into the software application), and Name (to designate the data being injected).

By way of illustration, FIGS. 2C and 2D show that name and password are enabled. Name includes the first name field 232 and the last name field 234. Hence, the first name will be injected into the first control, and the last name will be injected into the second control. The password will be injected into the third control.

The user can enable/disable the injection of specific fields, and also change the order of the injection. The order of the injection is particularly useful in the case of a dependency between user interface controls (e.g., changing a value in one control enables another control which is currently disabled).

According to block 130, the selected data is injected into the software application. Thereafter, the software application can continue to execute with the selected data.

After the user examines the data source and selects the data elements, the user can perform a single mouse click operation to inject the data into the application and corresponding controls. For example, clicking the inject button 260 in FIG. 2B will automatically injected the selected data (e.g., the selected first name, last name, and password) into the corresponding control of the software application. The data automatically transmits from its storage location (e.g., a table) to the proper controls in the application. Once the data reaches the user interface controls it is "injected" into the controls, and the user can continue to work and test the application.

Figure 3:
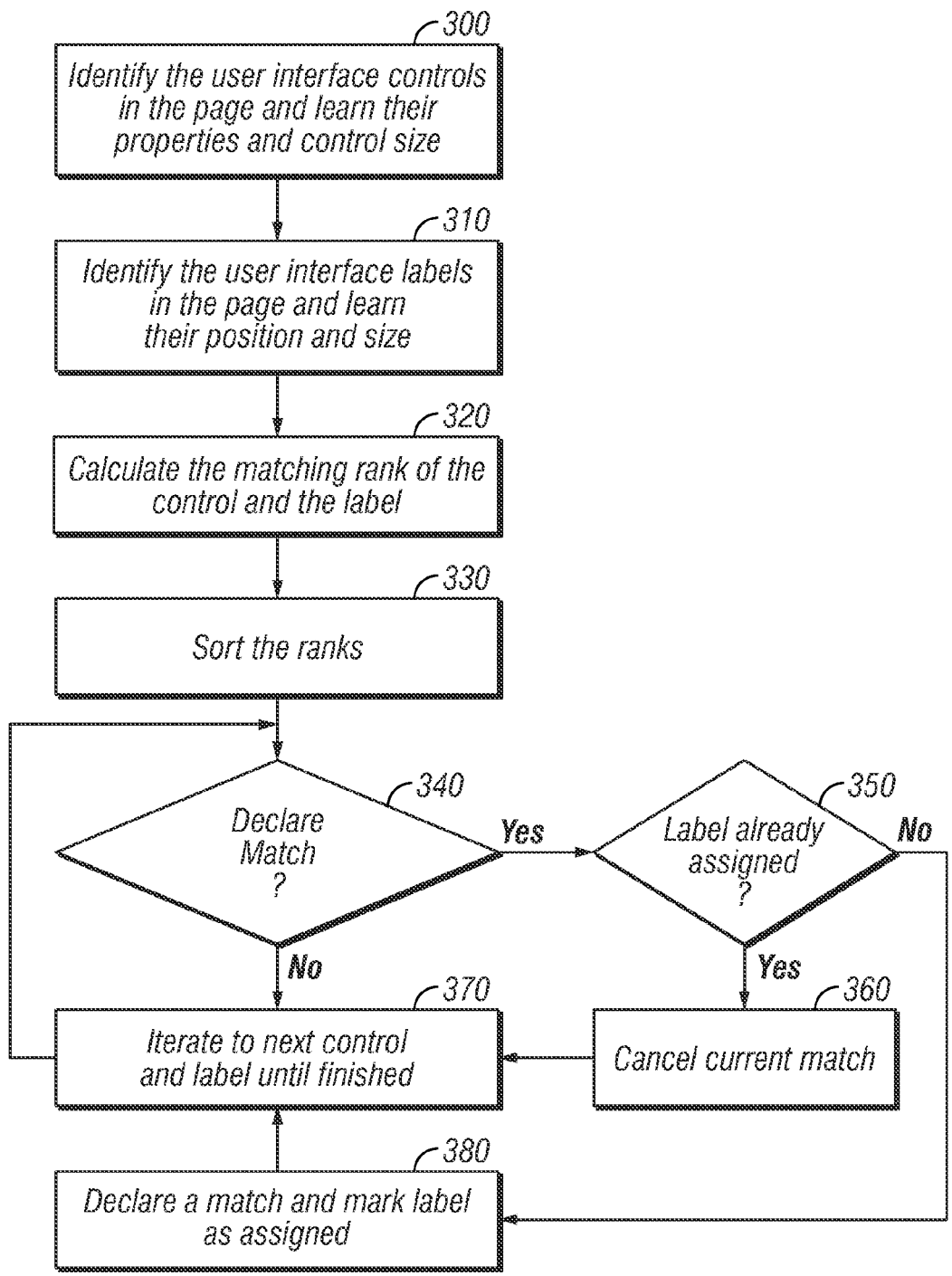
FIG. 3 shows a flow diagram of a probability-based algorithm for matching user interface labels to user interface controls in accordance with an example embodiment.

FIG. 3 shows a flow diagram of a probability-based algorithm for matching user interface labels to user interface controls. In order to assist in the discussion this flow diagram, the concepts of control and label are presented in FIGS. 4-5, and the concepts of alignment are presented in FIGS. 6-8.

As used herein and in the claims, a control is an interactive user interface element. Controls include, but are not limited to, an input box, check box, radio button, drop down list (combo box), button, etc. displayed on a computer or electronic device. A button is an example of a control that does not contain data.

Figure 4:
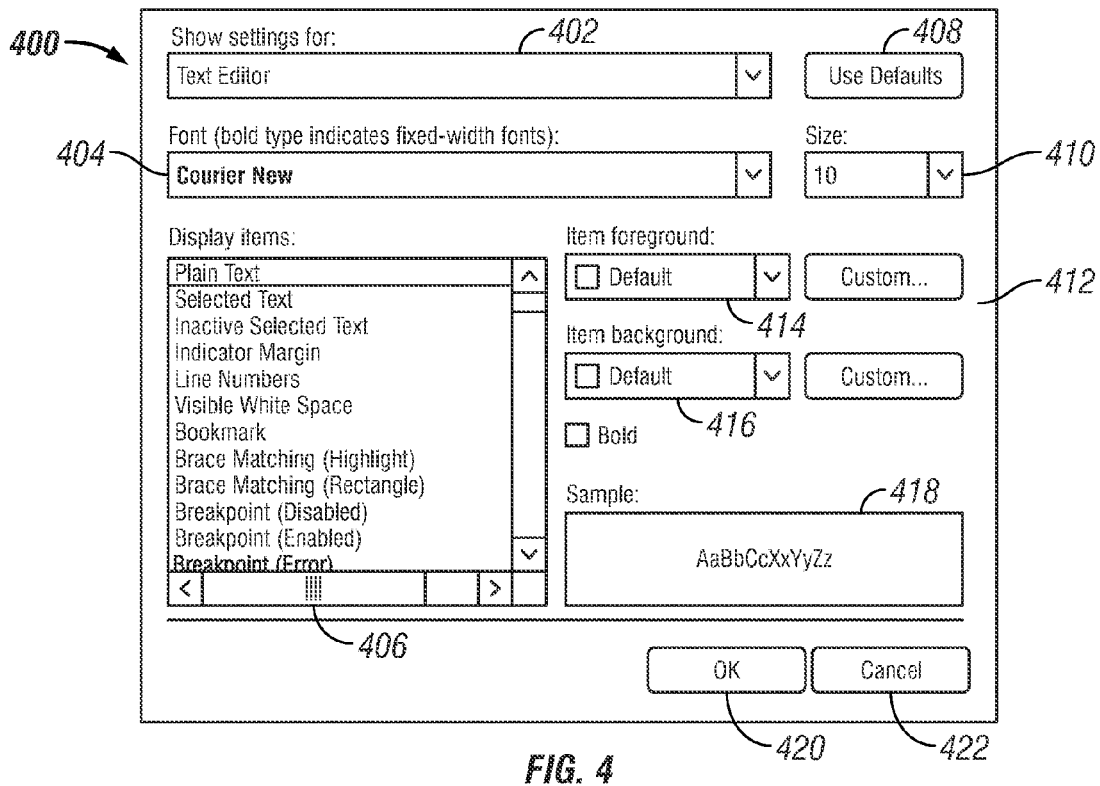
FIG. 4 shows a dialogue box or window having examples of user interface controls in accordance with an example embodiment.

By way of example, FIG. 4 shows a dialogue box or window 400 having examples of user interface controls. This box 400 includes a show settings field 402 (a text editor being selected), a font field 404 (Courier New being selected), display items field 406, use defaults field 408, font size field 410, custom boxes 412, item foreground box 414, item background box 416, a sample text box 418, an OK button 420, and a Cancel button 422.

As used herein and in the claims, a label is static text in a user interface, such as a graphical user interface (GUI).

Figure 5:
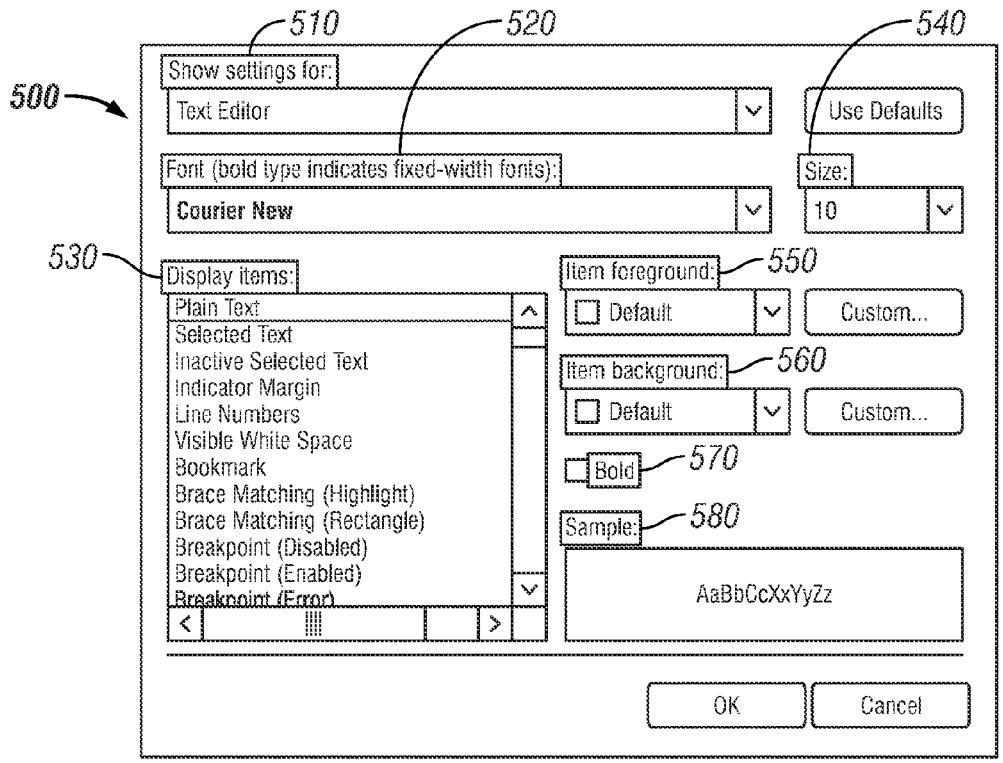
FIG. 5 shows a dialogue box or window having examples of user interface labels in accordance with an example embodiment.

By way of example, FIG. 5 shows a dialogue box or window 500 having examples of user interface labels. The labels are used to identify a user interface control (such as the user interface controls shown in FIG. 4). This box 500 includes fields or boxes with example labels as "show settings for" 510, "Font (bold type indicates fixed-width fonts)" 520, "display items" 530, "size" 540, "Item foreground" 550, "Item background" 560, "bold" 570, and "Sample" 580.

The user interface (e.g., shown in FIGS. 4 and 5) is composed of controls and labels. While viewing the display, a user can visually discern which label is related to which control. This task of matching a label to a control, however, is not trivial for a computer. The algorithm in FIG. 3 matches the user interface labels to user interface controls. This matching occurs before the data is injected into the software application.

In web applications, it is common to give a user interface control an internal label. In such cases, this internal label is used as the control identified, and there is no need to locate a matching textual label in the user interface.

Regarding label alignment, example embodiments include various ways to layout labels and controls in a user interface. These ways include, but are not limited to, left alignment of labels, right alignment of labels, and top alignment of labels.

Figures 6, 7:
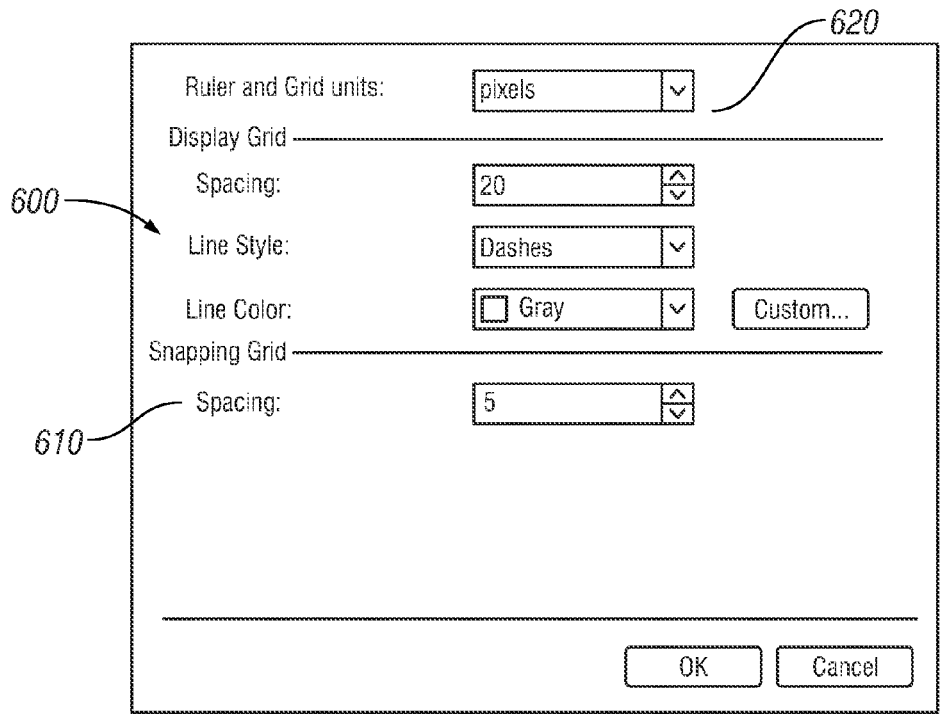
FIG. 6 shows a dialogue box having a plurality of labels aligned left of a plurality of controls in accordance with an example embodiment.
FIG. 7 shows a dialogue box having a plurality of labels aligned right of a plurality of controls in accordance with an example embodiment.

FIG. 6 shows a dialogue box or window 600 having a plurality of labels 610 (such as ruler and grid units, display grid, spacing, etc.) and a plurality of controls or control boxes 620. The labels 610 are aligned to the left and positioned to the left of the controls 620.

FIG. 7 shows a dialogue box or window 700 having a plurality of labels 710A, 710B (such as type, testing area, etc.) and a plurality of controls or control boxes 720A, 720B. The labels 710A, 710B are aligned to the right and positioned to the left of the controls 720A, 720B.

Figure 8:
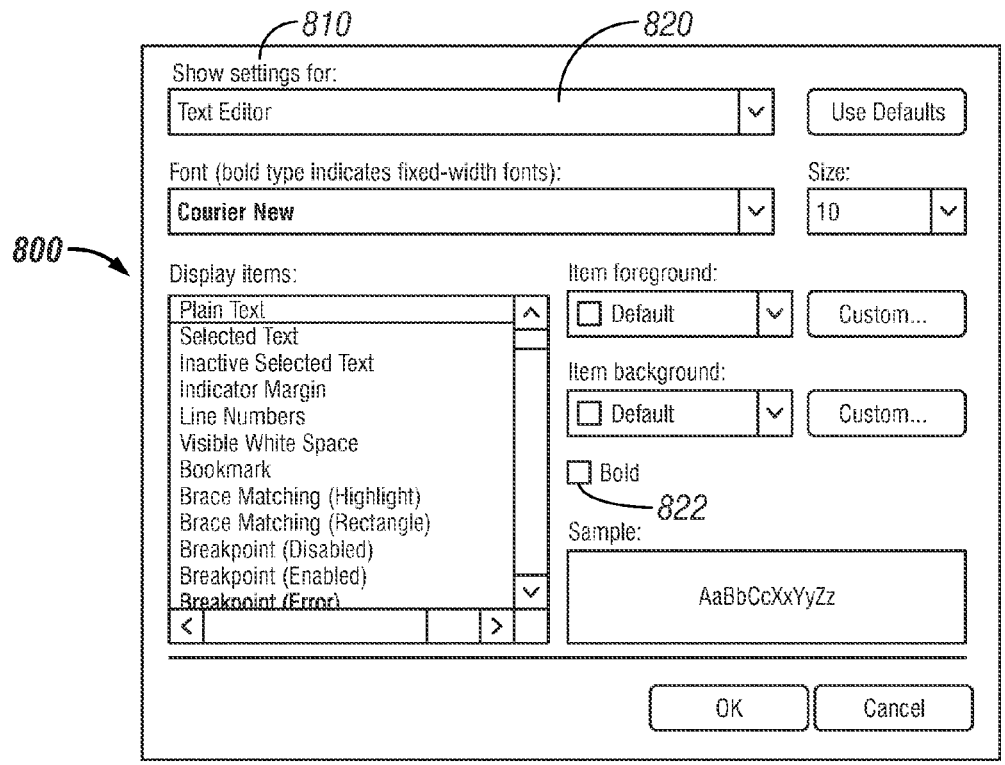
FIG. 8 shows a dialogue box having a plurality of labels aligned with a top of a plurality of controls in accordance with an example embodiment.

FIG. 8 shows a dialogue box or window 800 having a plurality of labels 810 (such as type, testing area, etc.) and a plurality of controls or control boxes 820. The labels 810 are aligned and positioned at the top of the controls 820. As shown in FIG. 8, labels can also be placed after the control (such as the label "Bold" being placed after check box 822).

FIG. 3 is now discussed for matching labels with controls. For illustration, the algorithm in FIG. 3 is directed to a Left-to-Right language, but it can be adapted to support Right-to-Left user interfaces.

According to block 300, a determination or identification is made of the user interface (UI) controls in the page (e.g., edit boxes, combo boxes, check boxes, control boxes), their respective properties (e.g., control type), their respective position (e.g., x-coordinate and y-coordinate), and their respective sizes (e.g., height and width).

According to block 310, a determination or identification is made of the user interface (UI) labels in the page, their respective position (e.g., x-coordinate and y-coordinate), and their respective sizes (e.g., height and width).

Figure 9:
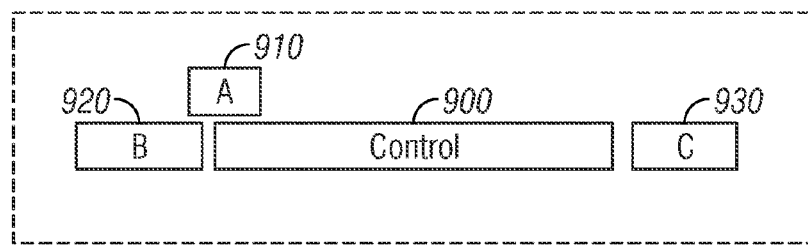
FIG. 9 shows a control box with labels in three expected positions in accordance with an example embodiment.

According to block 320, the matching rank of the control and label are calculated. The matching rank determines a probability that a label belongs to or is associated with a particular control. For example, a label associated with a particular control describes the control (e.g., a labeled named "user ID" for a control containing the identification for a user). This step is iterated over all UI controls. The matching ranks for a label and control are calculated as follows:

The algorithm in FIG. 3 makes an assumption that an expected position of a label is in one of three positions: left (for left aligned and right aligned labels), top (for top aligned labels), or right (for checkbox labels). FIG. 9 shows a control box 900 with labels in three expected positions, shown as 910 (top), 920 (left), and 930 (right). Area A at 910 denotes the expected position of the top-left corner of the control box for a top aligned label. Area B at 920 denotes the expected position of the left side of the control box for a left aligned label. Area C at 930 denotes the expected position of the right side of the control box for a right aligned or checkbox control (i.e., the label appearing adjacent a right side of the control box).

Figure 10:
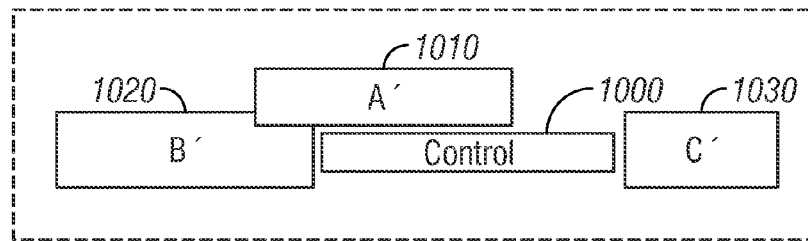
FIG. 10 shows a control box with enlarged label areas in the three expected positions in accordance with an example embodiment.

Example embodiments adjust for alignment problems. One embodiment defines secondary expected areas for labels. These areas are an enlargement of the expected position areas previously mentioned. FIG. 10 shows a control box 1000 with enlarged label areas in the three expected positions, shown as 1010 (top), 1020 (left), and 1030 (right). Area A' at 1010 denotes the enlarged expected position of the top-left corner of the control box for a top aligned label. Area B' at 1020 denotes the enlarged expected position of the left side of the control box for a left aligned label. Area C' at 1030 denotes the enlarged expected position of the right side of the control box for a right aligned or checkbox control (i.e., the label appearing adjacent a right side of the control box).

The algorithm in FIG. 3 also determines a correlation between the distance of a label from a given control and a probability of matching the identified label with the identified control. In one example embodiment, the probability of the matching between a label and a control decreases in proportion to the distance between the label and the corresponding control. This decrease in probability is not linear. For a certain small distance, confidence in the matching is relatively high. By contrast, for a large distance, the matching confidence is lower. For the in between distances, the probability of matching decreases in proportion to the distance between the label and the control.

Figure 11:
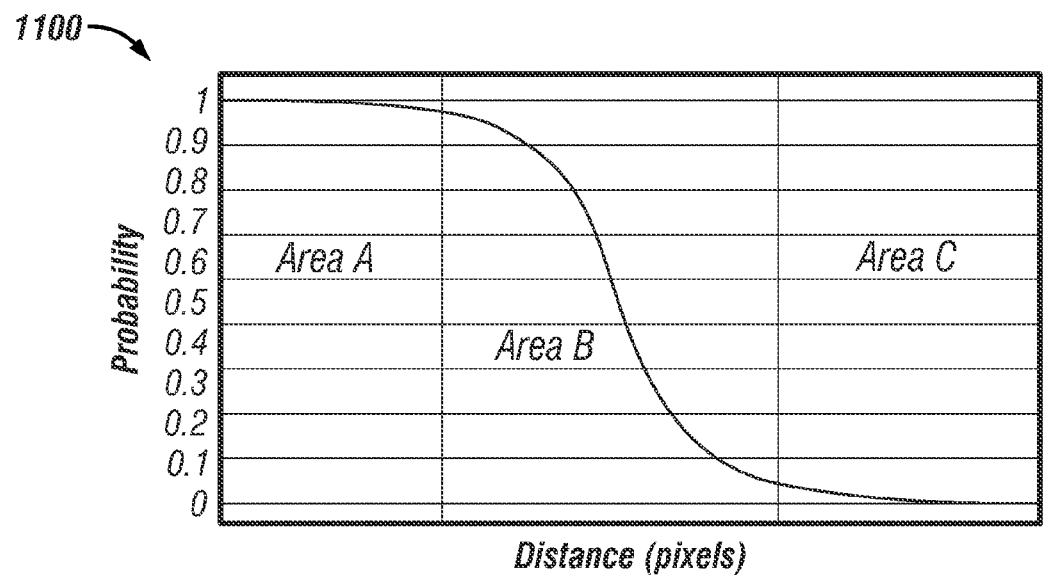
FIG. 11 shows a graph of a matching probability as a function of distance in accordance with an example embodiment.

FIG. 11 shows a graph 1100 of the matching probability as a function of the distance. The X-axis is distance (pixels), and the Y-axis is probability. Areas A, B, and C (discussed in FIG.) are shown.

Mathematically, the behavior of the curve in FIG. 11 is described using a complementary error function (i.e., a Gauss error function of sigmoid shape) or by a normal cumulative distribution function (i.e., a Gaussian distribution having a continuous probability distribution that describes data that clusters around the mean).

The correlation between distance of the label and a given control and the location of the label are used to calculate a matching rank between a label and a control. One example embodiment measures the distance (in pixels) between the control and the label. Since both the control and the label are two dimensional, a measuring pivot point is determined.

Figure 12:
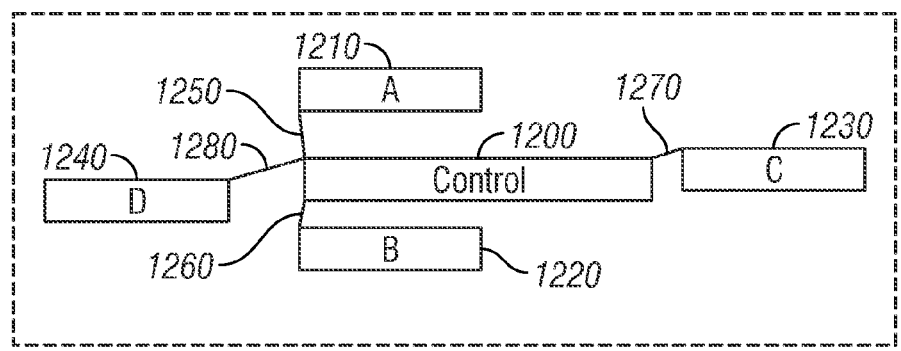
FIG. 12 shows a diagram for measuring the pivot point in accordance with an example embodiment.

FIG. 12 shows a diagram for measuring the pivot point. The diagram includes a control 1200, label A 1210, label B 1220, label C 1230, and label D 1240. The following rules are used to measure the pivot point. If the label is positioned above the control (e.g., label A 1210), a measurement is made of the distance between the top-left corner of the control to the bottom-left corner of the label (shown with line 1250). If the label is positioned below the control (e.g., label B 1220), a measurement is made of the distance between the bottom-left corner of the control to the top-left corner of the label (shown as line 1260). If the label is positioned to the right of the control (e.g., label C 1230), a measurement is made of the distance between the top-right corner of the control to the top-left corner of the label (shown as line 1270). If the label is positioned to the left of the control (e.g., label D 1240), a measurement is made of the distance between the top-left corner of the control to the top-right corner of the label (shown as line 1280).

A calculation is then made of the rank of the distance using the complementary error function getting a normalized rank between 0 and 1. Regardless of the distance, the probability increases if the label is positioned in the expected area discussed above (with Area C being applicable for "Checkbox" controls). In case the label pivot point falls inside the expected area, one example embodiment generates a "bonus" to the distance—multiplying it by a factor. There are two factors—for the primary expected area (Fp), and the secondary expected area (Fs), where Fp>Fs.

According to block 330, the ranks are sorted. For example, a highest rank is $R_1$; the next lowest rank is $R_2$; the next rank is $R_3$; etc.

According to block 340, a determination is made as to whether a match is declared. In one example embodiment, a match is declared only if a label and control are discovered that receive a high rank (which means that they are "close" enough), and also if this match is unique (there is no other control which is also quite "close" to the label). For this purpose, one example embodiment uses two thresholds:

(1) Proximity Threshold (PT)—a minimal rank that below it the string and control are considered too "far" and a match is not declared.

(2) Distinction Threshold (DT)—a minimal gap that is required between the highest rank and the second highest rank.

By way of example, a match is declared only if: $(R_1 > PT)$ and $(R_1 - R_2 > DT)$.

If a match is not declared at 340, then flow proceeds to block 370, and the iteration continues to the next control and label until finished.

If a match is declared at 340, then flow proceeds to block 350 wherein a determination is made whether the label is already assigned. If the label is not assigned, then flow proceeds to block 380 where the match is declared, and the label is marked as assigned. Flow then proceeds to block 370, and an iteration occurs to the next control and label until finished.

If the label is already assigned at block 350, then flow proceeds to block 360 where the current match is canceled. Here, the label is already assigned to another control, and a match cannot be declared. As such, the current match is canceled since it matches more than one control. The label itself remains assigned. Flow then proceeds to block 370.

Figure 13:
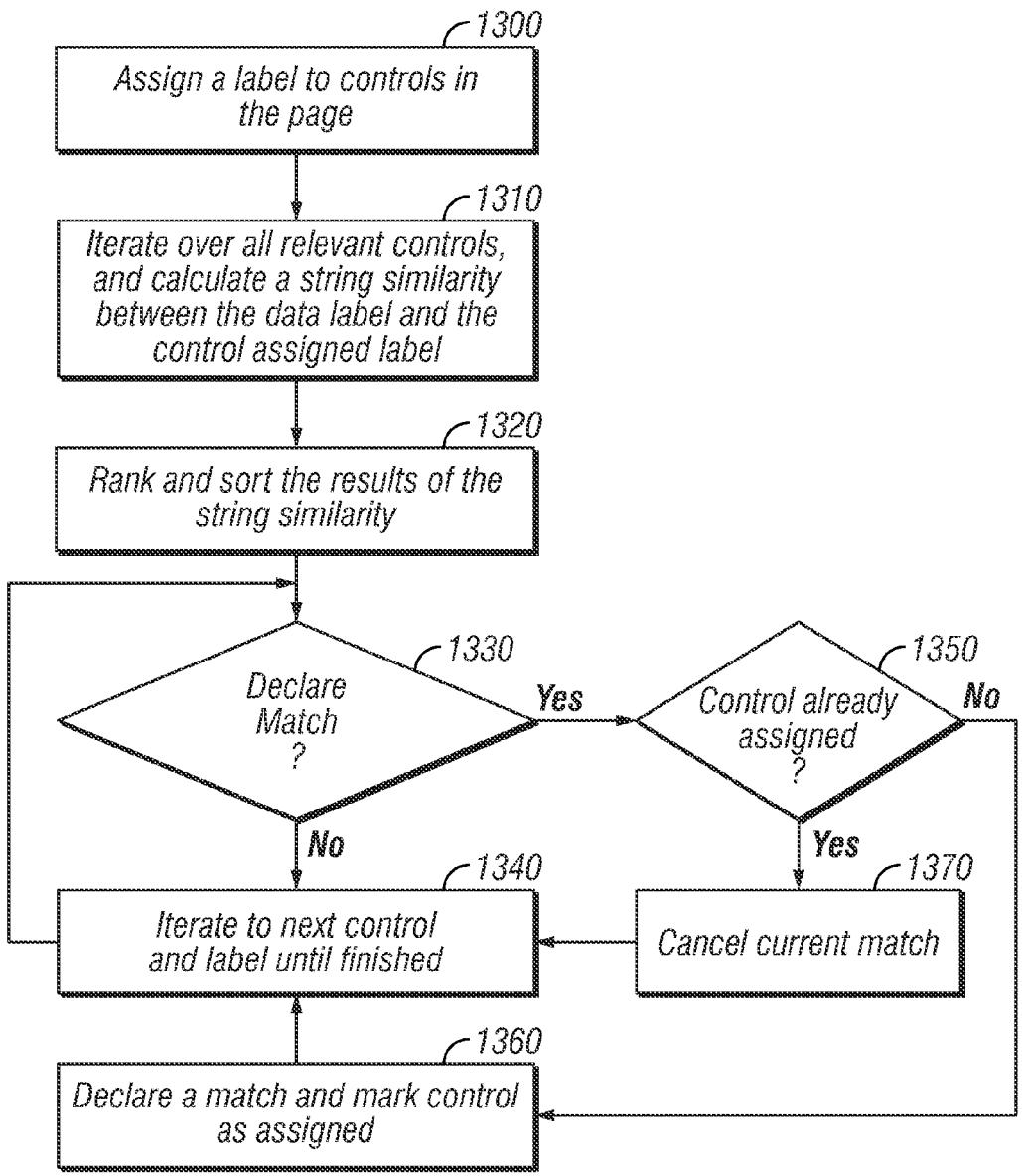
FIG. 13 shows a flow diagram of a probability-based algorithm for matching data element labels to user interface controls in accordance with an example embodiment.

FIG. 13 shows a flow diagram of a probability-based algorithm for matching data element labels to user interface controls in accordance with an example embodiment.

Theoretically, the user can give the data element a label that is identical to the UI control label, so the matching between the two will be trivial. In some cases, however, the data source is already given (e.g. database or excel imported from a production system), and the data source element label is not identical to the UI control label. Example embodiments address this issue, and inject data when minor differences exist between the data source element label and the UI control label. In case of a matching doubt, one example embodiment prefers to avoid injecting a certain element as opposed to injecting the element to the wrong UI control.

Example embodiments use a string similarity algorithm to measure string similarity. By way of example, such algorithms include, but are not limited to, a combination of two methods: Levenstein distance and Letter Pair metrics in which a weighted average is taken. This average is normalized to be in the range of 0 . . . 1. The Levenstein distance is a metric that measures an amount of different between two sequences (e.g., two strings) and is defined as the minimum number of edits needed to transform one sequence (first string) into the other sequence (second string). Example edit operations are insertion, deletion, or substation of a single character.

To allow more flexibility in the matching algorithm, one example embodiment uses an equivalent words dictionary. This dictionary contains common equivalent words, so in case the data source label and the UI label both appear as "equivalent" in this dictionary they will be considered "similar" although their Levenstein distance and Letter Pair measure show no similarity. For example, the dictionary can declare that "Mobile" is similar to "Phone", so in case the data source label is "Phone", but the UI control label is "Mobile", these two will be considered as a match, and the value will be injected in the "Mobile" control.

According to block 1300, a label is assigned to the relevant controls in the page. Once the label is assigned, the method proceeds to determine whether a match exists between the data element to be injected and the corresponding UI control.

The data to be injected is a set of pairs $\{L_i, V_i\}$ of strings. $L_i$ is the label of the data element, and $V_i$ is the value of the data element. The following steps are iterated over the data elements (L) as follows:

According to block 1310, iterate over all relevant controls, and calculate a string similarity between the data label ($L_i$) and the control assigned label.

According to block 1320, rank and sort the results of the string similarity. For example, a highest rank is $R_1$; the next lowest rank is $R_2$; the next rank is $R_3$; etc.

According to block 1330, a determination is made whether a match is declared. A match is declared if a pair of strings is similar enough, and also if this match is unique (there is no other string which is also quite similar). For this purpose, one example embodiment uses two thresholds:

(1) Similarity Threshold (ST): a minimal rank that below its strings are considered too different, and a match is not declared.

(2) Distinction Threshold (DT): a minimal gap that is required between the highest rank and the second highest rank.

Thus, one embodiment declares a match only if: $(R_1 > ST)$ and $(R_1 - R_2) > DT$.

If a match is not declared, then flow proceeds to block 1340 and the iteration continues to the next control and label until finished.

If a match is declared, then flow proceeds to block 1350, and a determination is made as to whether the control is already assigned.

If the control is not already assigned, then flow proceeds to block 1360, and the control is marked as assigned. Flow then proceeds to block 1340.

If the control is already assigned, then flow proceeds to block 1370, and the current match is canceled. Here, the control is already assigned to another label, and a match cannot be declared. As such, the current match is canceled since it matches more than one label. The control itself remains assigned. Flow then proceeds to block 1340.

Figure 14:
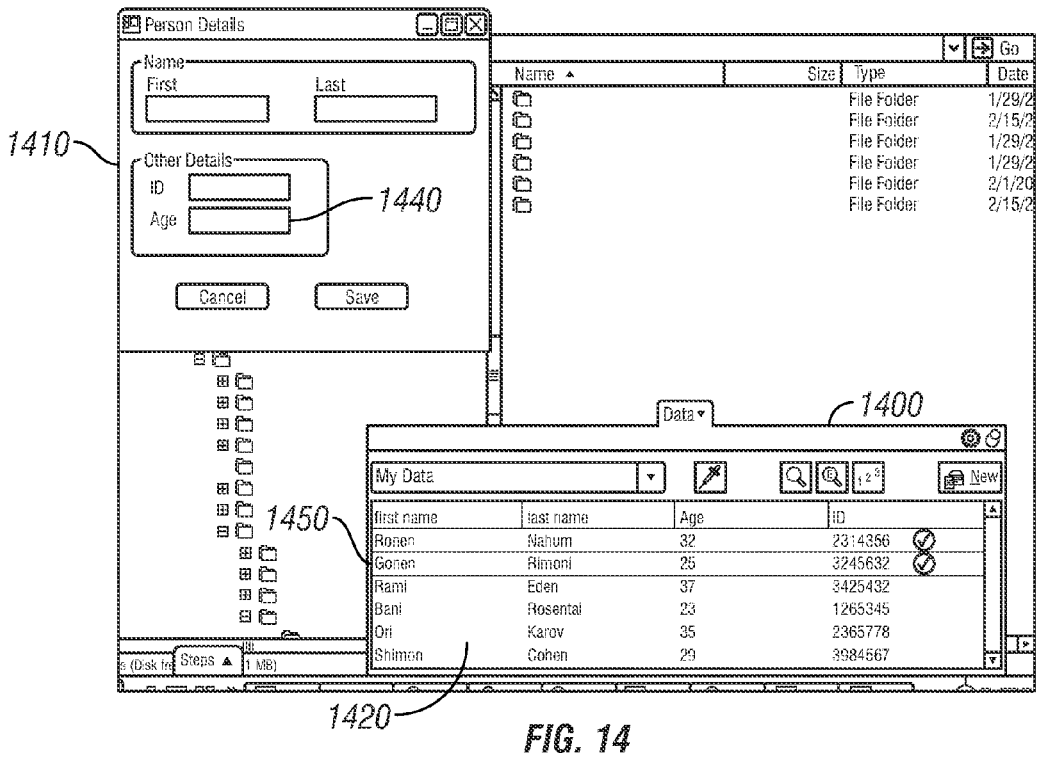
FIG. 14 shows a display of a row being selected for injection into a software application in accordance with an example embodiment.
Figure 15:
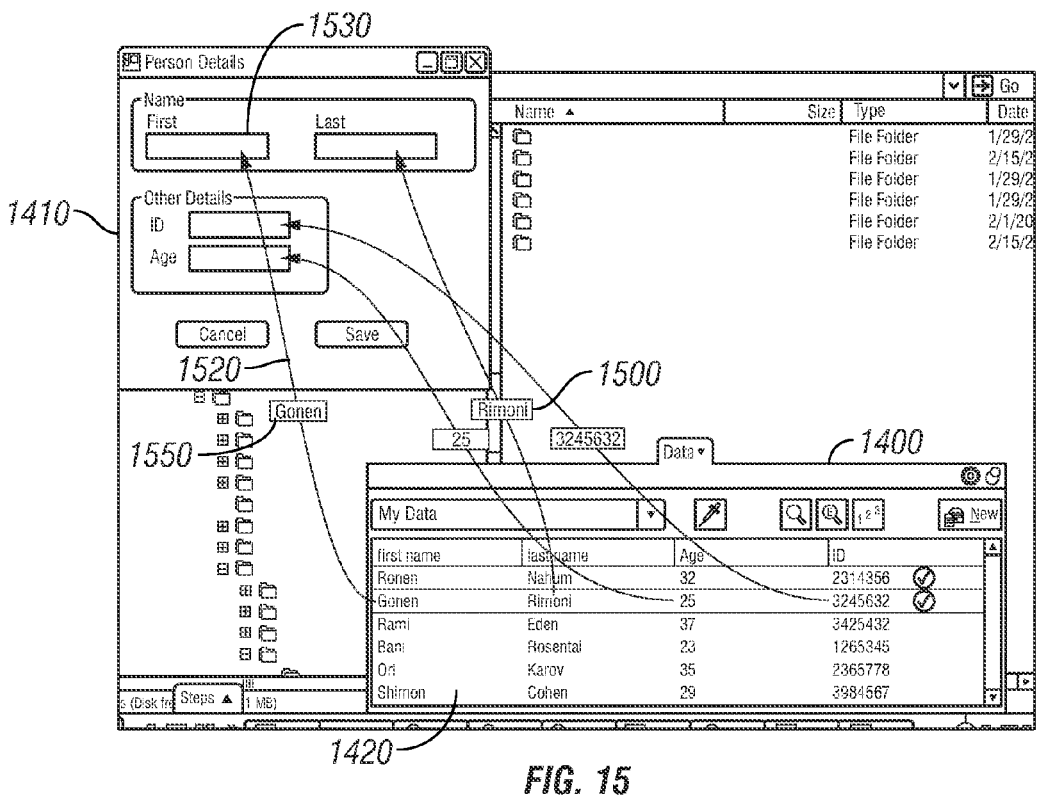
FIG. 15 shows a display with graphics illustrating data being injected from the data source to controls in the software application in accordance with an example embodiment.
Figure 16:
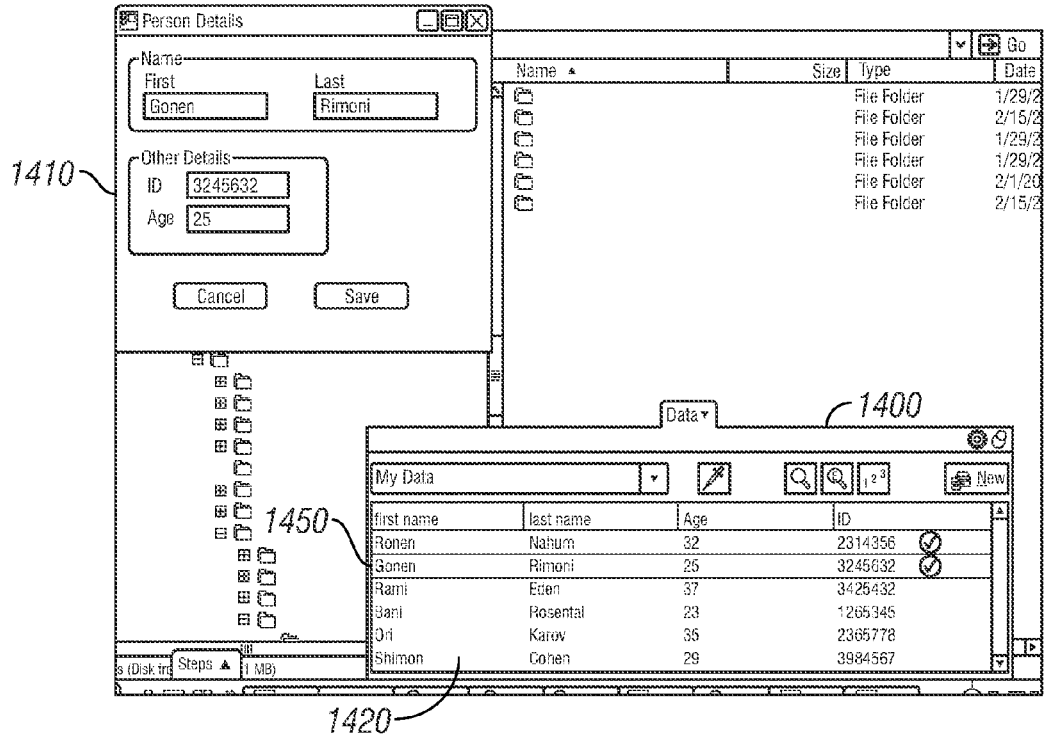
FIG. 16 shows a display with the graphics removed after the data has been injected from the data source to controls in the software application in accordance with an example embodiment.
Figure 17:
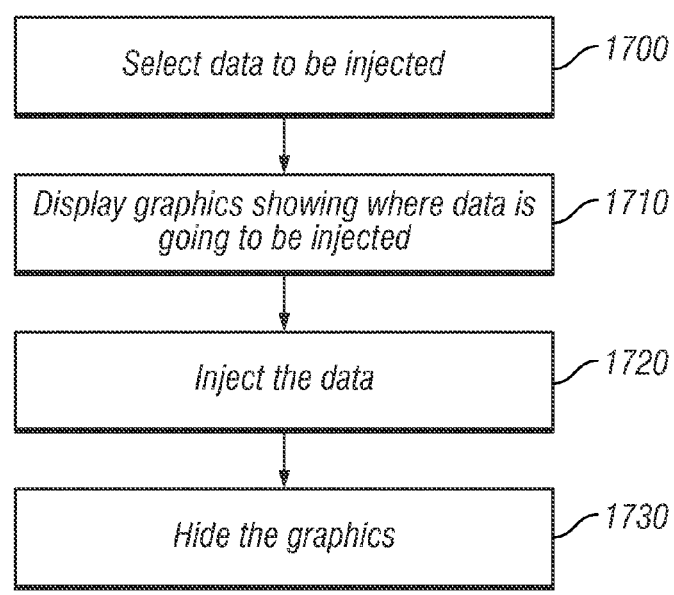
FIG. 17 shows a flow diagram for graphically animating on a display the process of injecting data from a data source to controls in accordance with an example embodiment.

FIGS. 14-17 describe a graphically animated way to visualize the process of injecting data from a data source into the software application. FIGS. 14-16 shows displays with a data source and controls, and FIG. 17 shows a flow diagram for graphically animating on a display the process of injecting data from a data source to controls.

According to block 1700, a user selects a data to be inserted from the data source to the software application.

FIG. 14 shows a display having a data source 1400 (shown as a table) that is simultaneously displayed with a dialogue box 1410. The data source 1400 has data 1420 arranged in a plurality of columns and rows. The data source 1400 has a plurality of labels 1420 (e.g., first name, last name, ID, and Age), and the dialogue box 1410 has a plurality of controls or control boxes 1440. The second row 1450 of the data source 1400 is highlighted to indicate that this row is selected for injection into a software application.

According to block 1710, graphics and/or animations are displayed to show where data is going to be injected into the controls of the software application.

According to block 1720, the data is injected from the data source into the control.

FIG. 15 shows the display of FIG. 14 with graphics 1500 illustrating data being injected from the data source to controls in the software application in accordance with an example embodiment. For each data element, the graphics 1500 include an arrow and a text box. The arrow starts at the point of origin of the data in the data source 1400 and ends at a destination (control) in the dialogue box 1410. For example, arrow 1520 starts in the first column (labeled "first name") at data element "Gonen" and ends in control box 1530 (i.e., the control box labeled "first name" in the dialogue box 1410). A text box 1550 connects to the arrow 1520 and displays the data (i.e., "Gonen") that will be injected from the table 1400 to the control 1530.

In one embodiment, once the user selects the data row to be injected, the display shows a short animation of the text "flying" into the application, and "settled down" into the proper controls. The animation stages occur as follows: Draw the new text elements on the place of the data that is going to be injected (e.g., a selected row, column, or other data). For each text element, a transition starts at the position of the text element in the data source. If the data source is a data table, then the starting point of this transition is the original position of the data element in the data table. The end point of this animation is the position of the control to which the data should be injected. The path between these points can be linear and/or curved. The transition speed can be linear, but one embodiment uses an "ease in" effect (slowing down a bit at the end). In one embodiment, all data fields can be animated simultaneously. Alternatively, the data fields can be animated individually or by groups.

According to block 1730, the current graphics for the selected data are hidden or removed.

FIG. 16 shows the display of FIG. 14 with the graphics removed after the data has been injected from the data source 1400 to controls 1440 in the software application.

Figure 18:
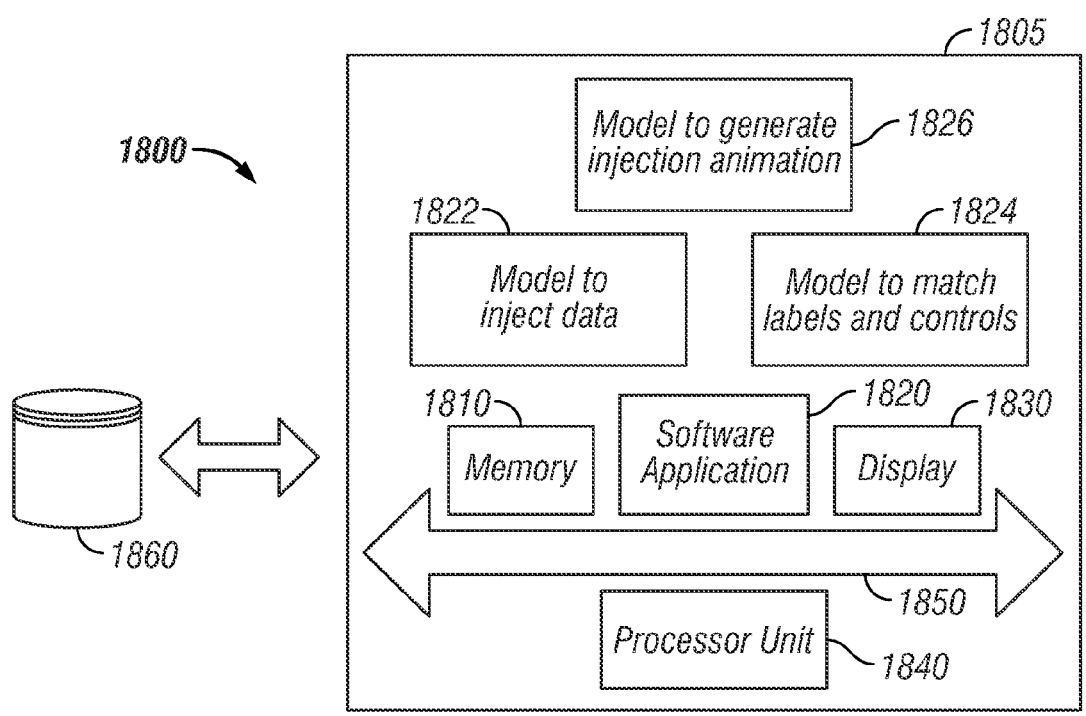
FIG. 18 shows a computer system in accordance with an example embodiment.

FIG. 18 shows a computer system 1800 for implementing example embodiments. The computer system includes one or more storage devices, databases, or warehouses 1860 coupled to one or more computers or servers 1805. The storage device can store data, such as the data source of tables, dialogue boxes, etc. in accordance with example embodiments. The computer 1805 includes memory 1810, a software application 1820 (e.g., the software application being designed and/or tested in accordance with example embodiments), a model or algorithm to inject data 1822 (such as a model to execute the method of FIG. 1), a model or algorithm to match labels and controls 1824 (such as a model to execute the methods of FIGS. 3 and 13), a model or algorithm to generate injection animation 1826 (such as a model to execute the method of FIG. 17), a display 1830, processing unit 1840, and one or more buses or connections 1850. The processor unit includes a processor (such as a central processing unit, CPU, microprocessor, application-specific integrated circuit (ASIC), etc.) for controlling the overall operation of memory 1810 (such as random access memory (RAM) for temporary data storage, read only memory (ROM) for permanent data storage, and firmware). The processing unit 1840 communicates with memory 1810 and models 1822, 1824, and 1826 and performs operations and tasks necessary for executing the methods explained herein. The memory 1810, for example, stores applications (such as application 1820), data, programs, algorithms (including software to implement or assist in implementing example embodiments) and other data.

Example embodiments can be applied on a wide variety of environments including, but not limited to standard applications, Web, .Net, Java, ActiveX, Visual Basic, etc. Further, a plurality of different data (e.g., entire rows and/or columns of data in a table) can be selected and injected in a single transaction (e.g., after a user selects one or more rows of data, a single click on an "inject" button injects the selected data into the corresponding controls). As such, users are not required to map between the user interface controls and the data sources labels (e.g. Excel worksheet columns). Instead, matching is automatically executed using one or more matching algorithms that are capable of overcoming subtle differences between field definitions and table header names. Furthermore, example embodiments can be integrated into a manual testing tool, and thus provide a built-in capability during the testing or design of software applications.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments are provided as examples and should not be construed to limit other embodiments. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit example embodiments.

In some example embodiments, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

Example embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known physical and tangible computer-readable media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles of example embodiments. Numerous variations and modifications will become apparent to those skilled in the art once the above disclosure is fully appreciated. It is intended that the following claims be interpreted to embrace all such variations and modifications.

What is claimed is:

1. A non-transitory computer readable storage medium having instructions that when executed by a processor cause the processor to:

identify controls and labels for the controls in a user interface;
measure distances between the labels and the controls;
calculate, for each of the labels, a probability that the respective label is a label for one of the controls based on a distance between the respective label and the one of the controls;
rank the labels and the controls based on the distances and the probabilities; and
assign each of the labels to one of the controls based on the ranking.

2. The non-transitory computer readable storage medium of claim 1, wherein the instructions are further to cause the processor to:
determine which of the labels are aligned above the controls, to the right of the controls, and to the left of the controls.

3. The non-transitory computer readable storage medium of claim 2, wherein, if one of the labels is aligned above one of the controls, the distance is measured between a top-left corner of the control to a bottom-left corner of the label.

4. The non-transitory computer readable storage medium of claim 2, wherein, if one of the labels is aligned to the right of one of the controls, the distance is measured between a top-right corner of the control to a top-left corner of the label.

5. The non-transitory computer readable storage medium of claim 2, wherein, if one of the labels is aligned to the left of one of the controls, the distance is measured between a top-left corner of the control to a top-right corner of the label.

6. The non-transitory computer readable storage medium of claim 1, wherein the instructions are further to cause the processor to:
cancel an assignment of one of the labels to one of the controls when the one of the labels is already assigned to another control.

7. The non-transitory computer readable storage medium of claim 1, wherein the distances are measured in pixels.

8. The non-transitory computer readable storage medium of claim 1, wherein the instructions are further to cause the processor to:
display data elements and the controls as the data elements are being injected into the controls.

9. The non-transitory computer readable storage medium of claim 1, wherein the instructions are further to cause the processor to:
determine a position, including an x-coordinate and a y-coordinate, of each of the labels on the user interface, and
rank the labels and the controls based on the distances, the probabilities, and the positions of the labels.

10. A method comprising:
identifying, by a processor, controls and labels for the controls in a user interface;
measuring, by the processor, distances between the labels and the controls;
calculating, for each of the labels, a probability that the respective label is a label for one of the controls based on a distance between the respective label and the one of the controls;
ranking, by the processor, the labels and the controls based on the distances and the probabilities; and
assigning each of the labels to one of the controls based on the ranking.

11. The method of claim 10, further comprising:
determining which of the labels are aligned above the controls, to the right of the controls, and to the left of the controls.

12. The method of claim 11, wherein, if one of the labels is aligned above one of the controls, the distance is measured between a top-left corner of the control to a bottom-left corner of the label.

13. The method of claim 11, wherein, if one of the labels is aligned to the right of one of the controls, the distance is measured between a top-right corner of the control to a top-left corner of the label.

14. The method of claim 11, wherein, if one of the labels is aligned to the left of one of the controls, the distance is measured between a top-left corner of the control to a top-right corner of the label.

15. The method of claim 10, further comprising:
canceling an assignment of one of the labels to one of the controls when the one of the labels is already assigned to another control.

16. The method of claim 10, further comprising:
determining a position, including an x-coordinate and a y-coordinate, of each of the labels on the user interface, and
ranking of the labels and the controls based on the distances, the probabilities, and the positions of the labels.

17. A computer system comprising:
a processor; and
a non-transitory computer readable medium storing instructions that when executed by the processor cause the processor to:
identify controls and labels for the controls in a user interface;
measure distances between the labels and the controls;
calculate, for each of the labels, a probability that the respective label is a label for one of the controls based on a distance between the respective label and the one of the controls;
rank the labels and the controls based on the distances and the probabilities; and
assign each of the labels to one of the controls based on the ranking.

18. The computer system of claim 17, wherein the instructions are further to cause the processor to:
determine which of the labels are aligned above the controls, to the right of the controls, and to the left of the controls.

19. The computer system of claim 17, wherein the instructions are further to cause the processor to:
cancel an assignment of one of the labels to one of the controls when the one of the labels is already assigned to another control.

20. The computer system of claim 17, wherein the instructions are further to cause the processor to:
determine a position, including an x-coordinate and a y-coordinate, of each of the labels on the user interface, and
rank the labels and the controls based on the distances, the probabilities, and the positions of the labels.

* * * * *